(12) United States Patent
Del-Gallo et al.

(10) Patent No.: US 9,212,096 B2
(45) Date of Patent: Dec. 15, 2015

(54) BUILDING BRICK COMPRISING A POROUS MATERIAL, THE MICROSTRUCTURE OF WHICH IS CONTROLLED BY THE ADDITION OF A NUCLEATING AGENT DURING THE PROCESS OF PREPARING SAME

(71) Applicant: L'Air Liquide, Societe Anonyme Pour l'Etude et l'Exploitation des Procedes Georges Claude, Paris (FR)

(72) Inventors: Pascal Del-Gallo, Dourdain (FR); Nicolas Richet, Fontenay-le-Fleury (FR); Sebastien Goudalle, Sens (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 14/382,772

(22) PCT Filed: Dec. 12, 2012

(86) PCT No.: PCT/FR2012/052886
§ 371 (c)(1),
(2) Date: Sep. 4, 2014

(87) PCT Pub. No.: WO2013/132163
PCT Pub. Date: Sep. 12, 2013

(65) Prior Publication Data
US 2015/0038318 A1 Feb. 5, 2015

(30) Foreign Application Priority Data

Mar. 5, 2012 (FR) ...................... 12 51990

(51) Int. Cl.
*C04B 33/04* (2006.01)
*C04B 33/30* (2006.01)
*C04B 22/00* (2006.01)
*C04B 28/18* (2006.01)
*C04B 2/10* (2006.01)
*C04B 111/28* (2006.01)

(52) U.S. Cl.
CPC . *C04B 33/04* (2013.01); *C04B 2/10* (2013.01); *C04B 22/0086* (2013.01); *C04B 28/18* (2013.01); *C04B 33/30* (2013.01); *C04B 2111/28* (2013.01)

(58) Field of Classification Search
CPC  C04B 41/4535; C04B 41/4539; C04B 35/18; C04B 35/182; C04B 35/184; C04B 35/186; C04B 35/188; C04B 35/20; C04B 35/16; C04B 35/195; C04B 41/4565
See application file for complete search history.

(56) References Cited

U.S. PATENT DOCUMENTS 3,847,634 A * 11/1974 Vickery ..................... 106/784
2010/0180797 A1 * 7/2010 Puckelwaldt .............. 106/164.4

FOREIGN PATENT DOCUMENTS

| CN | 101597935 | 12/2009 |
|----|-----------|---------|
| DE | 102005005258 | 8/2006 |
| DE | 102007027653 | 12/2008 |
| EP | 2354109 | 8/2011 |
| EP | 2540684 | * 1/2013 |
| FR | 2521197 | 8/1983 |
| FR | 2876400 | 4/2006 |
| FR | 2927623 | 8/2009 |
| FR | 2989707 | * 1/2013 |
| JP | 03033078 | * 2/1991 |
| JP | 07025681 | 1/1995 |
| JP | 2003160371 | 6/2003 |
| JP | 2006306702 | * 11/2006 |
| WO | WO 9802391 | 1/1998 |
| WO | WO 2011015751 | 2/2011 |

OTHER PUBLICATIONS

FR 1251990, French Search Report and Written Opinion, Oct. 23, 2012 (8 pp).
PCT/FR2012/052886, PCT Written Opinion, Mar. 5, 2012 (6 pp).
PCT/FR2012/052886, International Search Report, Mar. 26, 2013 (3 pp).

* cited by examiner

Primary Examiner — Karl Group
(74) Attorney, Agent, or Firm — Justin K. Murray

(57) ABSTRACT

A building brick with cellular structure comprising a porous material, said porous material being obtained by a process comprising the following successive steps:
   a step a) of synthesis of quicklime;
   a step b) of mixing said quicklime, water and silica;
   a step c) of introduction of a nucleating agent;
   a step d) of hydrothermal synthesis to obtain a ceramic mass, and
   a step e) of drying said ceramic mass obtained in step d).

11 Claims, 2 Drawing Sheets

BUILDING BRICK COMPRISING A POROUS MATERIAL, THE MICROSTRUCTURE OF WHICH IS CONTROLLED BY THE ADDITION OF A NUCLEATING AGENT DURING THE PROCESS OF PREPARING SAME

CROSS REFERENCE TO RELATED APPLICATIONS

This application is a §371 of International PCT Application PCT/FR2012/052886, filed Dec. 12, 2012, which claims the benefit of FR1251990, filed Mar. 5, 2012, both of which are herein incorporated by reference in their entireties.

TECHNICAL FIELD OF THE INVENTION

The present invention relates to a novel building brick with high insulating value.

BACKGROUND

Bricks of fired clay, called "Monomur bricks", or of cement, called "blocks", with cellular structure, are widely used for the construction of walls, floors, partitions or other elements of buildings.

The cells of these bricks, which are usually empty, of variable sizes and various shapes, serve to increase the thermal insulation. The free spaces of these cells must, however, be small enough to limit thermal convection and their walls must be thin enough to limit the conduction effect while maintaining a minimum mechanical strength. The heat resistance induced by the empty space of these cells is, however, limited by the convection effect of the air within it. It is possible to limit this effect by producing bricks having a larger number of smaller cells, but production of these so-called "Monomur" bricks is more complex and the resultant advantage is often cancelled by the increase in the conduction effect owing to multiplication of the walls of said cells.

The French patent application published under number 2521197A1 discloses bricks of fired clay with cells filled "with a cellular material with high thermal insulation value", such as "polyurethane foam, polystyrene foam, or any other fibrous materials (glass wool or rock wool) or divided materials (cork agglomerate)". However, depending on circumstances, these materials:

(i) are flammable and/or emit toxic gases in case of fire, (ii) are potentially hazardous compounds as they are ultimately classifiable in the category of the RCFs (Refractory Ceramic Fibers) requiring specific conditions for placement and then management of waste, (iii) lose their insulating properties over time (settling of the packing), (iv) or have several of the above drawbacks.

Moreover, in certain cases packing of the bricks is done in situ at the site, this constitutes an additional constraint and requires additional labor.

Document FR 2876400 discloses the use of hollow bricks filled "with an insulating material based on a loose porous product". The packing material is based on expanded perlite or expanded vermiculite, in which starch is used as thickener. This patent application also mentions the use of other components such as colloidal silica used as adhesive, hydrophobic agents, or dispersed plastic. The drawback of this solution lies in the low mechanical durability of the agglomerates, with a risk of deterioration during transport and installation of the elements. Moreover, the structure has low cohesive power, which notably leads to risks of loss of material during piercing and cutting of the walls. Settling of the grains over several years eventually leads to an uncontrollable decrease in insulating value.

Document FR 2927623 discloses elements of construction of the fired clay brick type, packed with foamed lime. This porous material consists of a lime-cement mixture of 65 to 90 wt % relative to the weight of total dry matter, fibers, mineral fillers, a hardener and a foaming agent. The principle is to make the lime set with a foaming agent to create air bubbles, trap them during the reaction and thus obtain a porous structure. The drawback of this solution lies in the need to use synthetic chemicals to help the lime to harden in the form of a porous material. Among these chemicals we may mention foaming agents, gelling agents, setting accelerators, and hardeners. With this method it is difficult to control the microstructure of such a material after synthesis, in particular the pore size and distribution, the total porosity and the type of stacks. Such a structure has low mechanical durability, which limits the potential reduction in the number or thickness of walls of fired clay brick and leads to risks of degradation of the porous material during placement of the elements of construction. It should also be noted that the presence of organic compounds (hardener, foaming agent, etc.) in the process may increase the fire resistance risk and the toxicity of the fumes emitted.

Thus, a problem that arises is to supply a building brick that does not have the drawbacks mentioned above; in particular a brick having good mechanical strength, i.e. above 10 kg/cm$^2$, and a very good insulating character, i.e. below 0.100 W/mK, preferably below 0.05 W/mK.

SUMMARY OF THE INVENTION

One solution of the invention is a building brick with cellular structure comprising a porous material, said porous material being obtained by a process comprising the following successive steps:

a step a) of synthesis of quicklime, by calcination at a temperature greater than or equal to 800° C. of limestone blocks with average size between 1 mm and 15 mm having a purity of at least 90 wt % and an open porosity above 0% to less than or equal to 25%, to obtain particles of quicklime;

a step b) of mixing said quicklime obtained in step a), water and silica, in a CaO/SiO$_2$ molar ratio between 0.5 and 3 to obtain a cream of said constituents;

a step c) of introducing a nucleating agent into the cream prepared in step b);

a step d) of hydrothermal synthesis by heating said cream obtained from step c) at a saturated water vapor pressure between 2·10$^5$ Pa and 20·10$^5$ Pa and at a temperature between 130° C. and 200° C. for a time between 15 hours and 30 hours, to obtain a ceramic mass, and a step e) of drying said ceramic mass obtained in step d) at a temperature between 100° C. and 400° C. for a time between 5 and 24 hours.

The hydrothermal synthesis of material in a homogeneous medium is generally carried out by homogeneous nucleation (formation of nucleating agent) and growth (enlargement of the nucleating agents). That is, species diffuse, generally in the liquid phase, to form nuclei (agglomerates of several hundred atoms), which will then grow to form the grains of the final material.

In order to grow, the nuclei must reach a critical diameter, which depends on the material and the synthesis conditions. If not, they are dissolved and supply material to form nuclei again. The nucleation step is therefore an equilibrium between the nuclei that reach the critical size and grow and those that are dissolved.

Hydrothermal synthesis in a heterogeneous medium makes it possible to control the nucleation step by introducing solid nucleating agents that are already at the critical size into the solution. This makes it possible to concentrate on the growth step of these nucleating agents and accelerate the synthesis kinetics. The nucleating agents are generally grains of the material to be obtained but may also be impurities or the surface of the reactor. The nature of the nucleating agents introduced may promote a crystalline form of the material synthesized and have an effect on the microstructure of the material or of the grains.

Introduction of a nucleating agent allows the control and synthesis of particular insulating porous silicocalcareous microstructures. Introduction of a nucleating agent may have several effects, which may or may not be simultaneous: accelerate the crystallization kinetics, improve the homogeneity of the microstructures, promote growth of a particular microstructure.

In fact, the building brick according to the invention allows a microstructure to be obtained with mechanical strength between 10 and 40 kg/cm$^2$ while having a porosity whose distribution of pore diameters is centered between 0.01 and 0.5 μm.

The porous material used in the bricks according to the invention is totally mineral and is made without adding organic chemicals and in this sense it complies with a sustainable development approach. These properties will not change over time through phenomena of settling as a consequence of stacking several bricks during wall construction.

From the economic standpoint, hydrothermal synthesis requires installations whose cost is proportional to the proposed operating temperature (and therefore pressure). Our invention makes it possible, by using a nucleating agent, to obtain a microstructure at a working temperature and/or pressure lower than the pressure or temperature that would have been required without using the nucleating agent, or greatly reduce the duration of hydrothermal synthesis at a given temperature and pressure (for example at 150° C. and at 4 bar, addition of nucleating agents will make it possible to reduce the synthesis time by a factor of 2, or 20-24 h instead of 40 h). Thus, the overall operating cost of the process is inevitably lowered while ensuring production of a product with the required uniform properties.

The brick according to the invention has one or more of the following features, as required:
- the production process comprises a step c1) during which some or all of the cells of at least one building brick with cellular structure are partially or completely filled with said cream prepared in step c), and in that said building brick with cellular structure, after undergoing said step c1), is then submitted to steps d) and e);
- said building brick is wetted beforehand with water before carrying out step c1); this step allows sealing of the open porosity and thus, during introduction of the cream, prevents the water contained in the latter being absorbed by capillarity;
- all the cells of said building brick with cellular structure are filled to at least 50% of their internal volume with said cream prepared in step c);
- in step c), 0.01 to 10 wt % of nucleating agent is introduced into the cream prepared in step b), preferably between 1 and 5 wt %. The nucleating agents are used in addition to the respective weights of the two constituents (lime, silica), or partially replacing the equivalent weight of one or more of the two basic constituents, or completely replacing the equivalent weight of one or more of the two basic constituents (lime, silica);
- the nucleating agent is selected from lime and/or silica in nanometric form, preferably in the form of colloidal suspension, or in the form of a powder with granulometry between 10 nm and 100 μm, preferably between 50 nm and 5 μm; in this case dissolution of the species and recombination thereof as a nucleate is kinetically favored by a granulometric effect;
- the nucleating agent is a powder with silicocalcareous base ($Ca_XSi_YO_Z$) of granulometry between 10 nm and 100 μm, preferably between 50 nm and 5 μm or a colloidal suspension of one of the following crystalline phases: gyrolite, tobermorite, xonotlite, foshagite, jennite, afwillite, hillebrandite, wollastonite or a mixture of one or more of these crystalline phases; in this case the nucleates are of the same chemical composition as the crystals that grow on them: this is called homogeneous nucleating;
- the nucleating agent is a powder or a suspension of oxide of magnesium, of aluminum, of barium, of iron, of sodium, of titanium or a zeolite; in this case nucleating is initiated by adding a component of a chemical nature different from that synthesized; this is called heterogeneous nucleating; the crystalline structure resulting from growth starting from heterogeneous nucleates may be modified by the crystalline structure of the nucleate;
- said building brick with cellular structure is a fired clay brick;
- the drying step is preferably carried out at a temperature between 150° C. and 400° C., for a time between 5 hours and 40 hours, preferably between 10 and 24 hours.

In the process for producing the porous material as defined above, the limestone blocks used in step a) are of average size between 0.1 mm and 15 mm, preferably between 1 mm and 12 mm. It was established that these values allowed them to be calcined thoroughly in relatively simple conditions, obtaining, after calcination, a quicklime of granulometry between 0.1 mm and 15 mm, guaranteeing that the latter has good reactivity during addition of water in the execution of the second step of the process (reactivity measured according to standard NF EN 459-2), without excessive risk of hydration and/or carbonation that could result from the manner of storage of the lime after calcination and which, ultimately, might affect the quality of the silicocalcareous porous structure.

The limestone blocks used in step a) of the process as defined above may be obtained by crushing larger blocks of limestone and then sieving.

They have a purity ($CaCO_3$ content relative to the total weight of limestone) of at least 90 wt % and preferably of at least 95 wt %, or even of at least 97 wt %, which limits the presence of impurities that might affect the hydrothermal synthesis starting from the precursors of the crystalline structures described above.

The limestone used according to the process for producing the porous material as defined above thus preferably contains less than 6 wt % of magnesium carbonate and of silica and less than 1 wt % of alumina, of iron oxide, of manganese oxide, of other oxides, notably of potassium, sodium, titanium and of impurities such as sulfur or phosphorus.

Finally, the open porosity of the limestone, measured by mercury porosimetry, is above 0% to less than or equal to 25% and preferably between 5 and 25%, so that the carbon dioxide may easily escape during the formation of lime during the chemical reaction:

$$CaCO_3 \rightarrow CaO + CO_2$$

and so that the quicklime formed is not densified during this reaction; and may easily absorb water to form milk of lime very quickly, namely in less than ten minutes, preferably in less than 5 minutes during execution of step b) of the process as defined above.

During execution of step a) of the process for producing the porous material as defined above, it was notably observed that, for a plateau time fixed at two hours, the temperature should not be below 800° C. nor above 1100° C. Moreover, in the case when the calcination temperature is fixed at 1100° C., the plateau time should not be substantially more than one hour. It will therefore be understood that a person skilled in the art will be able to adjust the temperature and duration of roasting of the limestone to a certain extent, provided the temperature is above 850° C. for at least one hour. An adjustment might in fact become necessary depending on the particular type of furnace, the amount of limestone treated and the arrangement (such as the thickness of the layers) of the product in the furnace. A temperature of about 900° C. for about three hours is preferred. At this temperature, in fact, it was observed that the sintering kinetics was relatively slow and that the plateau time only had a slight effect on the reactivity. Roasting at this temperature therefore allows adjustment of the calcination time to the industrial constraints.

Step a) of the process for producing the porous material as defined above thus makes it possible to obtain a quicklime having satisfactory reactivity and able to form the required crystalline phase after hydrothermal synthesis. Preferably, the quicklime obtained has a total content of water and carbon dioxide below 2 wt %.

In step b) of the process for producing the porous material as defined above, the quicklime obtained at the end of step a) is mixed with silica. The latter may be amorphous or crystalline; it comprises at least 90 wt % of $SiO_2$; it preferably contains at least 90 wt % of particles with average size below 100 μm, so that its reactivity with lime is as high as possible. Silicas of this type are now commercially available.

The lime and silica are more particularly mixed together in a $CaO:SiO_2$ molar ratio between 0.5 and 1.5. It may also comprise, in trace amounts, phases derived from the binary $CaO\text{---}SiO_2$, mainly silicocalcareous phases of the type $Si_x\text{-}Ca_yO_z(OH)_w,i(H_2O)$. Moreover, the weight ratio of water to solid precursors (lime+silica) is more particularly greater than or equal to 3 and less than or equal to 10.

In this approach, no organic compound (surfactant, dispersant, antifoaming agent, thickener, etc.) is added to the formulation.

In step d) of the process for producing the porous material as defined above, the cream obtained in step c) is heated for a time generally between 1 h and 40 h. According to a particular aspect of the process as defined above, in step d) thereof, the reaction temperature is greater than or equal to 130° C. and more particularly less than or equal to 160° C. According to another particular aspect, step d) of the process as defined above is carried out at a saturated vapor pressure less than or equal to $10 \times 10^5$ Pa (10 bar), preferably less than or equal to $5 \times 10^5$ Pa (5 bar).

In step e) of the process as defined above, the drying time is generally between 1 hour and 48 hours, preferably between 5 hours and 24 hours and it is generally carried out at atmospheric pressure. The function of this step is more particularly not only to remove the residual water, but also optionally to endow the treated mass with a crystalline structure. This step is carried out in a conventional electric or gas-fired furnace; it may or may not be the same as that used for step d). According to a particular aspect of the process as defined above, in step e) thereof, the drying temperature is greater than or equal to 100° C. and less than or equal to 250° C.

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

DETAILED DESCRIPTION

The present invention will now be described in more detail with the aid of the folLOWING EXAMPLES.

EXAMPLES

Demonstration of the Effect of a So-Called Homogeneous Nucleating Agent on the Microstructure after Hydrothermal Synthesis and Drying Two mixtures were prepared, the first called formulation 1 was prepared with the following proportions by weight:

TABLE 1

| composition of formulation 1 | |
|---|---|
| Water (wt %) | 78% |
| Lime (wt %) | 10.7% |
| Silica (wt %) | 11.3% |

The second mixture called formulation 2 was prepared by replacing a proportion of the silica used above in the form of powder with colloidal silica (Sigma Aldrich Ludox® SM30). Colloidal silica is the nucleating agent in this case (cf. Table 2).

TABLE 2

| composition of formulation 2 | |
|---|---|
| Water (wt %) | 78% |
| Lime (wt %) | 10.7% |
| Silica (wt %) | 10.6% |
| Nucleating agent (wt %) | 0.7% |

Figure 1:
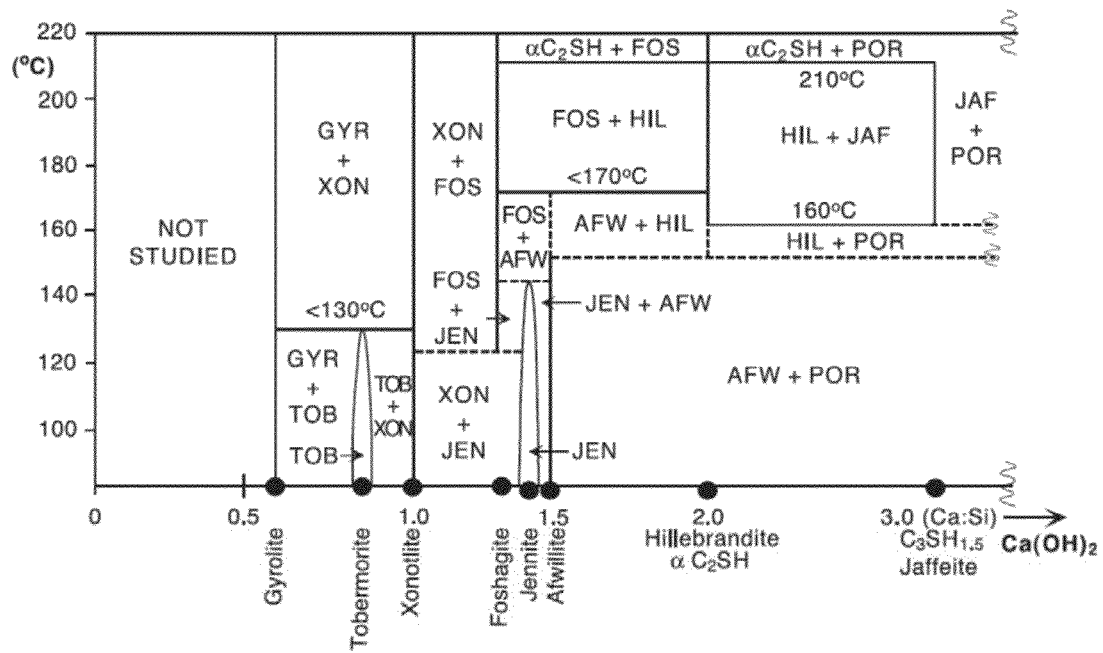
FIG. 1 provides a phase diagram.

These two mixtures are mixed for 40 min at 600 rev/min and then put in an autoclave at 196° C. for 30 hours. After this cycle of so-called hydrothermal synthesis, the water still present in the system is removed in a cabinet at atmospheric pressure under dry air at 200° C. In view of the phase diagram presented in FIG. 1 and taking into account our Ca/Si atomic ratio, according to our protocol we should synthesize tobermorite and xonotlite.

Figure 2:
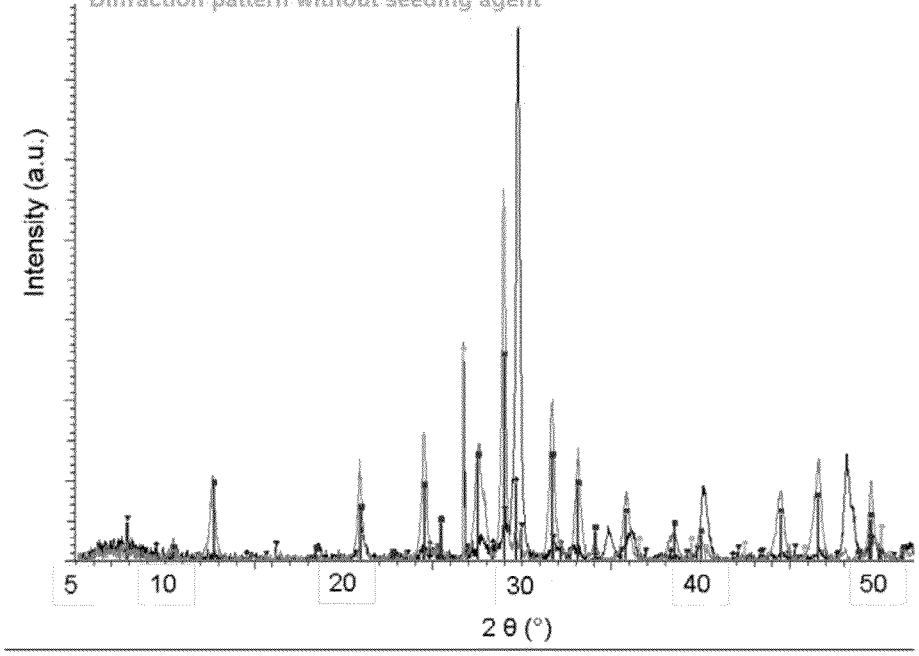
FIG. 2 provides an X-ray diffraction analysis of formulation 1 and formulation 2.

To establish the nature of the crystalline phases, an X-ray diffraction analysis was performed. Superposition of the diffraction patterns is presented in FIG. 2. It can clearly be seen that the predominant crystalline phase is not the same in the porous mass resulting from formulation 1 as that resulting from formulation 2. This result is confirmed by a semiquantitative analysis of the phases present (cf. Table 3).

TABLE 3 quantitative values of the crystalline phases synthesized

|  | Tobermorite (vol %) | Xonotlite (vol %) | Other phases $Ca_xSi_yO_z$ |
|---|---|---|---|
| Mixture 1 | 80% | 10% | 10% |
| Mixture 2 | 2% | 94% | 4% |

It is known and accepted that tobermorite is a crystalline phase that will evolve thermodynamically toward transformation to xonotlite if the synthesis conditions permit (P, T, time). Thus, introduction of colloidal silica plays the role of nucleating agent by lowering the energy barrier of formation of nucleates of critical size through reduction of the radius of one of the constituents of the mixture. The dissolution rate of the silica is therefore greatly accelerated and the system crystallizes in the thermodynamically most stable xonotlite phase.

Figure 3:
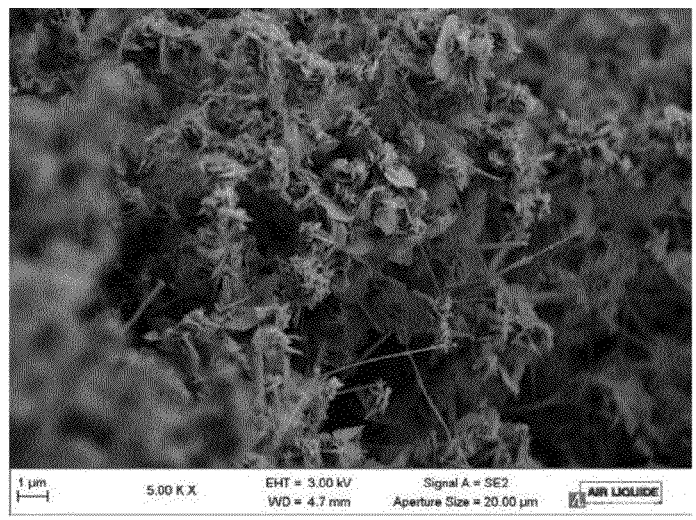
FIG. 3 provides photo taken by a scanning electron microscope (SEM photo).
Figure 4:
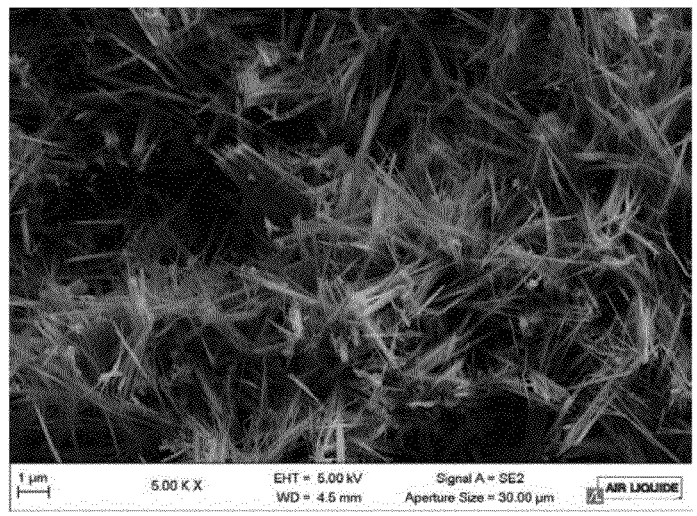
FIG. 4 provides photo taken by a scanning electron microscope (SEM photo).

Having demonstrated the effect of the nucleating agent on the nature of the crystalline phases synthesized, the resultant samples of formulations 1 and 2 were observed with the scanning electron microscope (SEM) (FIG. 3 and FIG. 4). The benefit of using a homogeneous nucleating agent to reduce/accelerate the reaction kinetics is evident from observation of the microstructures. Knowing that the macroscopic properties of a material reflect the morphology of the crystals of which it is constituted, the properties resulting from the 2 formulations tested will be different. That is why a Brinell hardness test was performed on these two microstructures. It is found that the Brinell hardness of formulation 1 is 0.04 HB with a standard deviation of 0.02 whereas that of mixture 2 is 0.43 with a standard deviation of 0.02. By modifying the microstructure, the introduction of colloidal silica led to the formation of a homogeneous microstructure 10 times harder than the same mixture not containing colloidal silica.

Demonstration of the Effect of a So-Called Heterogeneous Nucleating Agent on the Microstructure after Hydrothermal Synthesis and Drying In order to demonstrate the effect of the nature of the nucleating addition on the form of the crystals and therefore on the microstructure after hydrothermal synthesis (120-160° C., 2-5 bar) and drying at low temperature (<200° C.), six formulations were prepared (cf. Table 4). Effectively two parameters determine crystallization: the granulometry of the nucleating addition (via the average diameter) and the wettability that the latter possesses with respect to the system to which it is added. In any case, the Ca/Si atomic ratio is always conserved, including in the 6 formulations presented. This stoichiometric ratio must not vary, so as to be able to compare the microstructures obtained.

TABLE 4

Composition of the 6 formulations

| Percentage by weight | Water | Lime (CaO) | Silica ($SiO_2$) | Nucleating agent |
|---|---|---|---|---|
| Formulation 3 (without nucleating agent) | 78% | 10.7% | 11.3% | 0% |
| Formulation 4 (finely ground zeolite) | 78% | 10% | 10.6% | 1.4% |
| Formulation 5 (colloidal silica) | 78% | 10.7% | 10.6% | 0.7% |
| Formulation 6 (calcium phosphate) | 78% | 10% | 11.3% | 0.7% |
| Formulation 7 (finely ground magnesia) | 78% | 10% | 10.6% | 1.4% |
| Formulation 8 (finely ground γ alumina) | 78% | 10% | 10.6% | 1.4% |

These 6 mixtures are mixed for 40 min at 600 rev/min and then put in an autoclave at 150° C. for 24 hours. After this cycle of so-called hydrothermal synthesis, the water still present in the system is removed in a cabinet at atmospheric pressure under dry air at 100° C.

Figure 5:
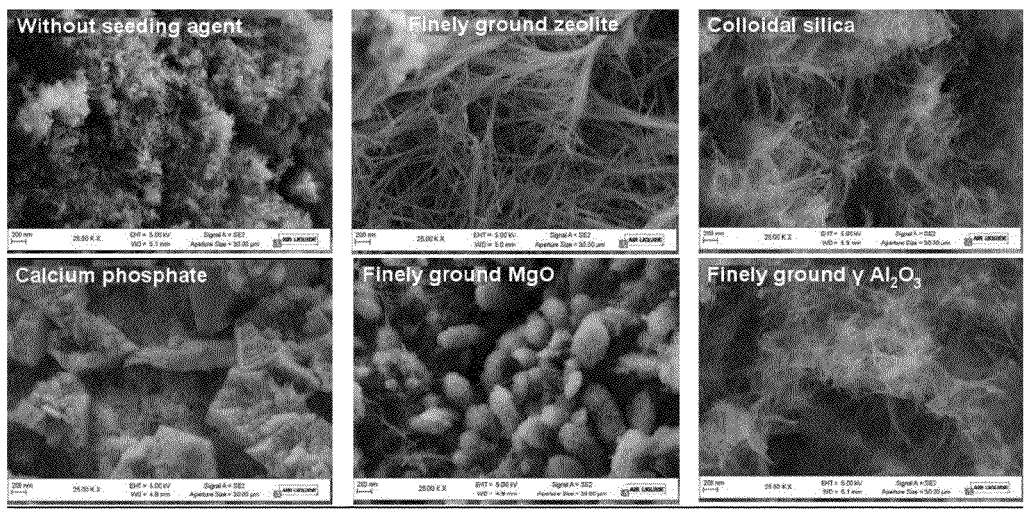
FIG. 5 provides photos of formulations 3 through 8 taken by a scanning electron microscope (SEM photo).

The samples resulting from formulations 3 to 8 were observed with the scanning electron microscope (SEM). The benefit of using a heterogeneous nucleating agent is clear from observation of the microstructures, notably from the form of the crystals (FIG. 5).

Thus, by modifying the free energy of the system, introduction of heterogeneous nucleates makes it possible to modify the form of the crystals synthesized. This phenomenon alters the microstructures formed and supplies a means for controlling the macroscopic properties (heat resistance and mechanical strength).

To verify this, a Brinell hardness test was performed on each of these 6 samples. The results are presented in Table 5.

TABLE 5

Brinell hardness for the 6 formulations

|  | Brinell hardness | Standard deviation |
|---|---|---|
| Formulation 3 (without nucleating agent) | 0.23 HB | 0.03 |
| Formulation 4 (finely ground zeolite) | 0.43 HB | 0.03 |
| Formulation 5 (colloidal silica) | 0.54 HB | 0.03 |
| Formulation 6 (calcium phosphate) | 0.43 HB | 0.03 |
| Formulation 7 (finely ground magnesia) | 0.59 HB | 0.02 |
| Formulation 8 (finely ground γ alumina) | 0.36 HB | 0.02 |

It can be seen from Table 5 that addition of nucleates of different chemical natures makes it possible to modify the microstructure at the nanometric scale and consequently improves the mechanical properties. By doing this, and in the proposed application, namely filling the cells of a fired clay brick with an insulating porous mass, improvement of the mechanical properties of the contents may be an important parameter.

In the case of the test without addition of nucleate at 150° C./4 bar, it is found that the mechanical properties are not so high (Brinell hardness) as those obtained on the samples with nucleating. To obtain a similar result it would have been necessary to increase the duration of hydrothermal synthesis by a factor of 2.

The invention allows fine adjustment of the production process by controlling the nanostructure of the macroscopic properties found.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a non-exclusive listing (i.e., anything else may be additionally included and remain within the scope of "comprising"). "Comprising" as used herein may be replaced by the more limited transitional terms "consisting essentially of" and "consisting of" unless otherwise indicated herein.

"Providing" in a claim is defined to mean furnishing, supplying, making available, or preparing something. The step may be performed by any actor in the absence of express language in the claim to the contrary a range is expressed, it is to be understood that another embodiment is from the one.

Optional or optionally means that the subsequently described event or circumstances may or may not occur. The description includes instances where the event or circumstance occurs and instances where it does not occur.

Ranges may be expressed herein as from about one particular value, and/or to about another particular value. When such particular value and/or to the other particular value, along with all combinations within said range.

All references identified herein are each hereby incorporated by reference into this application in their entireties, as well as for the specific information for which each is cited.

The invention claimed is:

1. A building brick with cellular structure comprising a secondary material, said secondary material being obtained by a process comprising the following successive steps:
   a) synthesizing quicklime, by calcination at a temperature greater than or equal to 800° C. of limestone blocks of average size between 1 mm and 15 mm having a purity of at least 90 wt % and an open porosity above 0% to less than or equal to 25%, to obtain particles of quicklime;
   b) mixing said quicklime obtained in step a) with water and silica, in a $CaO/SiO_2$ molar ratio between 0.5 and 3 to obtain a cream of said constituents;
   c) introducing a nucleating agent into the cream prepared in step b);
   d) heating said cream obtained from step c) at a saturated water vapor pressure between $2.10^5$ Pa and $20.10^5$ Pa and at a temperature between 130° C. and 200° C. for a time between 15 hours and 30 hours, to obtain a ceramic mass; and
   e) drying said ceramic mass obtained in step d) at a temperature between 100° C. and 400° C. for a time between 5 and 24 hours,
   wherein the production process comprises a step c1) in the course of which some or all of the cells of at least one building brick with cellular structure are partially or completely filled with said cream prepared in step c), and in that said building brick with cellular structure, after undergoing said step c1), is then submitted to steps d) and e).

2. The building brick as claimed in claim 1, wherein said building brick is wetted beforehand with water before carrying out step c1).

3. The building brick as claimed in claim 1, wherein all the cells of said building brick with cellular structure are filled to at least 50% of their internal volume with said cream prepared in step c).

4. The building brick as claimed in claim 1, wherein in step c), from 0.01 to 10 wt % of nucleating agent is introduced into the cream prepared in step b), preferably from 1% to 5%.

5. The building brick as claimed in claim 1, wherein the nucleating agent is selected from the group consisting of lime, silica, and combinations thereof.

6. The building brick as claimed in claim 5, wherein the nucleating agent is in nanometric form.

7. The building brick as claimed in claim 5, wherein the nucleating agent is in the form of colloidal suspension.

8. The building brick as claimed in claim 5, wherein the nucleating agent is in the form of a powder with granulometry between 50 nm and 2 µm.

9. The building brick as claimed in claim 1, wherein the nucleating agent is a powder with granulometry between 50 nm and 5 µm or a colloidal suspension selected from the group consisting of one of the following crystalline phases: gyrolite, tobermorite, xonotlite, foshagite, jennite, afwillite, hillebrandite and combinations thereof.

10. The building brick as claimed in claim 1, wherein the nucleating agent is a powder or a suspension of oxide of magnesium, of aluminum, of barium, of iron, of sodium, of titanium or a zeolite.

11. The building brick as claimed in claim 1, wherein said building brick with cellular structure is a fired clay brick.

* * * * *